(No Model.)
G. B. ST. JOHN.
LANDSIDE FOR PLOWS.
No. 278,623. Patented May 29, 1883.
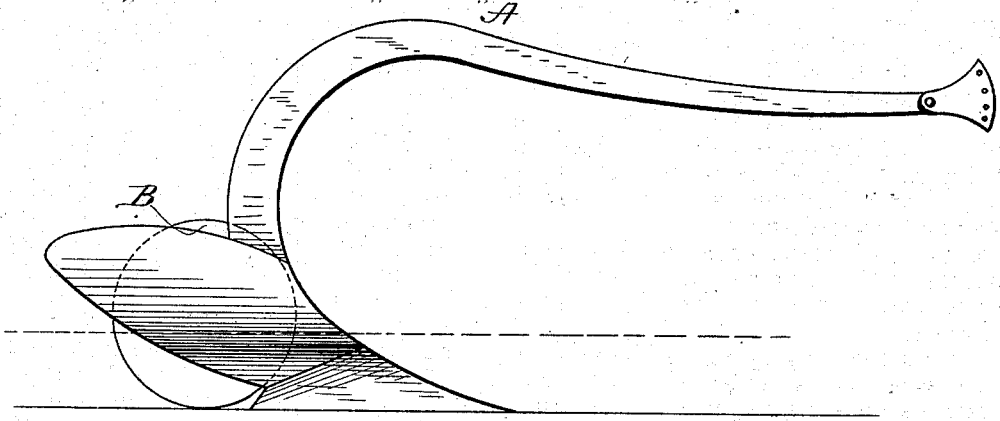
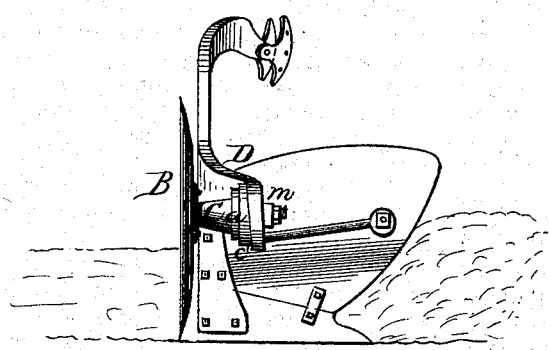
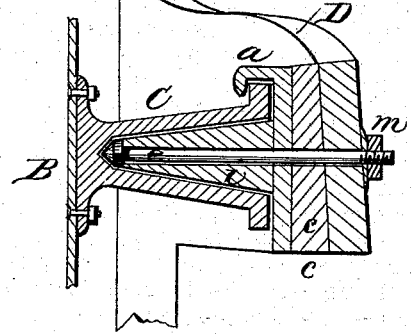
WITNESSES
Franck L. Ourand
R. T. Campbell
INVENTOR
Garland B. St. John
by L. Deane
his Attorney

UNITED STATES PATENT OFFICE.

GARLAND B. ST. JOHN, OF CEDAR RAPIDS, IOWA.

LANDSIDE FOR PLOWS.

SPECIFICATION forming part of Letters Patent No. 278,623, dated May 29, 1883.

Application filed September 22, 1882. (No model.)

*To all whom it may concern:*

Be it known that I, GARLAND B. ST. JOHN, of the city of Cedar Rapids, in the county of Linn and State of Iowa, have invented certain new and useful Improvements in Landsides for Plows, of which the following is a specification.

My object in this invention is to lessen the friction and thereby lighten the draft of the plow by substituting for the ordinary landside a revolving blade or disk so adjusted that its face, near the lower periphery, bears against the unplowed land and prevents the plow from running in that direction.

The invention consists in such disk or blade, together with the apparatus for attaching it to the plow, as will be more fully hereinafter described.

In the accompanying sheet of drawings, Figure 1 represents a side view of the plow; Fig. 2, a rear view of the same, showing the arrangement of the landside; and Fig. 3, the detail of the adjusting device.

A is a plow-beam, preferably of iron, though, with slight modifications wood, may be used, if desired. To the beam are attached a share and mold-board in the usual way. From the rear of the beam extends a lug, D, so arranged that the axle of the revolving disk may be attached thereto, and when so attached the left or outer face of the disk shall be in line, or nearly so, with the land side of the furrow. In practice it is well to set the blade at a slightly different angle from that of the face of the furrow, leaving a little clearance at the top, as indicated in Fig. 2. When a heavy pressure is brought against the mold-board the middle of the blade receives it, and thus the result is to hold the plow in the proper position, and enable it to run much lighter than if the bearing were upon the whole depth of furrow. The proper angle is secured by means of the wedge-shaped washer c, placed between the supporting-lug and the axle, by turning the same to any point desired.

The landside is provided with a sharp edge, similar to a rotary colter, and is preferably of thin material to enable it to penetrate the ground from the weight of the plow alone. The result of this is that when the plow is thrown out of the ground by a stone or other obstruction the landside cuts into the ground again and holds the plow from crowding to land in getting the new furrow, as would be the case if the lower periphery of such landside-wheel were a broad surface. Besides, the cutting-edge is better adapted to meet inequalities in the furrow itself by passing through them instead of riding over them.

The arrangement of the axle is shown in Fig. 3. C is a tapering hub terminating in a flange at each end. The landside is connected to the flange at the smaller end. The hole in the hub corresponds to the outward taper, and does not pass entirely through it, but terminates in a rounded or slightly conical bottom. The axle is a tapered plug fitting this hole, with a bolt passing through it, the head of which fits the bottom of the hole described. The large end of the axle bears against the face of a sand-band, a, and is held in place by means of the bolt e, which passes through such sand-band, the angular washer, and the lug, and is drawn tightly by a large nut, m. The sand-band is provided with a recess a portion of its circumference, in which the flange at the large end of the hub operates, and by which such hub is kept from slipping off the axle. As the pressure is mostly on the outer face of the landside, it will be seen that the principal wear is on the head of the bolt and the bottom of the hole. For increased durability these parts may be made very hard by chilling, tempering, or case-hardening. Being very simple in their construction, they can be easily and cheaply replaced when worn out.

Having thus described my invention, what I claim as new, and desire to secure by Letters Patent, is—

1. The combination of the plow-beam A, having a lug, D, with a revolving disk, B, said lug being arranged that the axle of said disk may be attached thereto, so that its outer face shall be practically in a line with the land side of the furrow, substantially as described.

2. In a revolving landside, substantially as described, the hub C, axle i, bolt e, sand-band a, wedged-shaped washer c, and plow A D, substantially as and for the purpose set forth.

Witness my hand this 23d day of August, 1882.

GARLAND B. ST. JOHN.

Attest:
J. M. ST. JOHN,
FRANK G. CLARK.